US011393332B2

(12) United States Patent
Chen et al.

(10) Patent No.: US 11,393,332 B2
(45) Date of Patent: Jul. 19, 2022

(54) DETECTION DEVICE AND INDOOR NAVIGATION SYSTEM

(71) Applicant: PIXART IMAGING INC., Hsin-Chu (TW)

(72) Inventors: Shih-Feng Chen, Hsin-Chu (TW); Yen-Min Chang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 18 days.

(21) Appl. No.: 17/091,594

(22) Filed: Nov. 6, 2020

(65) Prior Publication Data

US 2021/0272449 A1    Sep. 2, 2021

Related U.S. Application Data

(63) Continuation-in-part of application No. 16/803,371, filed on Feb. 27, 2020, now Pat. No. 10,863,261.

(51) Int. Cl.
| | |
|---|---|
| *G08G 1/01* | (2006.01) |
| *G08G 1/015* | (2006.01) |
| *H04R 3/00* | (2006.01) |
| *G08G 1/07* | (2006.01) |

(52) U.S. Cl.
CPC ........... *G08G 1/0104* (2013.01); *G08G 1/015* (2013.01); *G08G 1/07* (2013.01); *H04R 3/005* (2013.01)

(58) Field of Classification Search
CPC ........ G08G 1/0104; G08G 1/015; G08G 1/07; H04R 1/1041; H04R 1/08; H04R 1/1016; H04R 1/406; H04R 3/005; H04R 2420/07; G10K 11/17873; G10K 2210/1081; G10L 25/18; G10L 25/51
USPC ..... 381/300, 306, 307, 309, 311, 26, 56, 57, 381/58, 320, 74, 92, 97, 98
See application file for complete search history.

(56) References Cited

U.S. PATENT DOCUMENTS

2014/0049420 A1*   2/2014   Lehning ................. G08G 1/015
                                                                        342/109

FOREIGN PATENT DOCUMENTS

JP           2011-240888         * 12/2011

* cited by examiner

*Primary Examiner* — Norman Yu
(74) *Attorney, Agent, or Firm* — Li & Cai Intellectual Property (USA) Office

(57) ABSTRACT

A detection device and an indoor navigation system are provided. The detection device includes two detection modules each including a sound receiver for receiving sound from a peripheral object and a signal converting circuit that is electrically coupled to the sound receiver and that is configured to convert input signal from the sound receiver into a target spectrogram. The two spectrograms from the signal converting circuits have a time/phase difference, and at least one wireless earphone includes a storage unit and a judging circuit that is electrically coupled to the storage unit and the two signal converting circuits. The judging circuit is configured to compare any target spectrogram with basic spectrograms of the storage unit so as to determine which kind of objects the peripheral object is, and is configured to obtain an instant position of the peripheral object by the time/phase difference.

11 Claims, 13 Drawing Sheets

DETECTION DEVICE AND INDOOR NAVIGATION SYSTEM

CROSS REFERENCE TO RELATED APPLICATION

This application is a continuation-in-part of U.S. application Ser. No. 16/803,371 filed on Feb. 27, 2020 and entitled "PORTABLE APPARATUS AND WEARABLE DEVICE".

FIELD OF THE DISCLOSURE

The present disclosure relates to a detection device, and more particularly to a detection device and an indoor navigation system.

BACKGROUND OF THE DISCLOSURE

When a conventional detection device are used to detect position of an object, the conventional detection device is usually operated by using a camera to detect the object, so that the detecting function of the conventional detection device is limited to a viewing range of the camera.

SUMMARY OF THE DISCLOSURE

In response to the above-referenced technical inadequacies, the present disclosure provides a detection device and an indoor navigation system to effectively improve the issues associated with conventional detection devices.

In one aspect, the present disclosure provides a detection device for being assembled to a traffic light device having a plurality of traffic lights. The detection device includes two detection modules configured to be operated at the same time. Each of the two detection modules includes a sound receiver and a signal converting circuit. The sound receiver is configured to continuously receive an external sound generated from a peripheral object in movement so as to obtain an input signal. The signal converting circuit is electrically coupled to the sound receiver. The signal converting circuit is configured to convert the input signal from the sound receiver into a target spectrogram. In the detection device, the two spectrograms respectively converted from the two signal converting circuits have a time/phase difference there-between. At least one of the two detection modules includes a storage unit and a judging circuit. The storage unit has a plurality of basic spectrograms therein that respectively correspond to sounds respectively generated from different kinds of objects in movement. The judging circuit is electrically coupled to the storage unit and the two signal converting circuits. The judging circuit is configured to compare any one of the two target spectrograms with the basic spectrograms so as to determine which kind of the objects the peripheral object is, and is configured to obtain an instant position of the peripheral object by the time/phase difference. The detection device is configured to transmit the instant position of the peripheral object to the signal light device, so that the traffic lights of the traffic light device are changeable according to the instant position of the peripheral object.

In certain embodiments, in each of the two detection modules, the signal converting circuit includes an amplifying unit electrically coupled to the sound receiver, a filtering unit electrically coupled to the amplifying unit, and a converting unit that is electrically coupled to the filtering unit. The converting unit of each of the two detection modules is electrically coupled to the judging circuit.

In certain embodiments, each of the sound receivers includes at least one omnidirectional microphone.

In certain embodiments, the storage unit has a visual geometry group (VGG) training model therein, and the basic spectrograms are generated by the VGG training model.

In certain embodiments, the VGG training model is configured to selectively modify the basic spectrograms according to the target spectrograms.

In certain embodiments, each of the two detection modules includes a speaker electrically coupled to the judging circuit, and wherein in each of the two detection modules, the speaker is configured to generate a soundwave to delete a noise that is received by the sound receiver and includes the external sound.

In certain embodiments, the objects include a car and a motorcycle.

In certain embodiments, the two detection modules are defined to be operated at a horizontal plane.

In certain embodiments, the judging circuit is configured to obtain a velocity and an orientation of the peripheral object by the time/phase difference.

In another aspect, the present disclosure provides an indoor navigation system, which includes a detection device and a path planning apparatus. The detection device has two detection modules that are configured to be operated at the same time. Each of the two detection modules includes a speaker, a sound receiver, and a signal converting circuit. The sound receiver is configured to continuously receive an external sound generated from a peripheral object in movement so as to obtain an input signal. The signal converting circuit is electrically coupled to the sound receiver. The signal converting circuit is configured to convert the input signal from the sound receiver into a target spectrogram. In the detection device, the two spectrograms respectively converted from the two signal converting circuits have a time/phase difference there-between. At least one of the two detection modules includes a storage unit, a judging circuit, and a Bluetooth transceiver. The storage unit has a plurality of basic spectrograms therein that respectively correspond to sounds respectively generated from different kinds of objects in movement. The judging circuit is electrically coupled to the storage unit, the two signal converting circuits, and the two speakers. The judging circuit is configured to compare any one of the two target spectrograms with the basic spectrograms so as to determine which kind of the objects the peripheral object is, and is configured to obtain an instant position of the peripheral object by the time/phase difference. The Bluetooth transceiver electrically coupled to the judging circuit. The path planning apparatus includes a storing member, a Bluetooth unit, and a calculating unit. The storing member has an indoor map. The Bluetooth unit is wirelessly coupled to the Bluetooth transceiver of the detection device for receiving an instant position of the detection device and the instant position of the peripheral object. The detection device is configured to transmit a navigation request signal to the path planning apparatus through the Bluetooth transceiver and Bluetooth unit. The calculating unit is electrically coupled to the storing member and the Bluetooth unit. The calculating unit is configured to match the instant position of the detection device and the instant position of the peripheral object with the indoor map so as to obtain an indoor navigation path satisfying the navigation request signal. The path planning apparatus is configured to transmit the indoor navigation path to the detection device through the Bluetooth unit.

In certain embodiments, the two detection modules are two wireless earphones that are configured as a pair, a quantity of the peripheral object detected by the detection device is more than one, and the detection device is allowed to simultaneously obtain the instant positions of the peripheral objects. The objects include a shopping cart and a pedestrian, and wherein the indoor map stored in the storing member is a market map, and the navigation request signal is a shopping navigation request signal.

In certain embodiments, a quantity of the detection device of the indoor navigation system is more than one, and each of the detection devices is electrically coupled to the path planning apparatus through the Bluetooth transceiver thereof. The calculating unit is configured to match the instant positions of the detection devices and the instant positions of the peripheral objects with the indoor map so as to obtain the indoor navigation path satisfying the navigation request signal.

In certain embodiments, the two sound receivers are configured to receiver an input sound to respectively acquire a first sound signal and a second sound signal, and the detection device includes a microcontroller electrically connected to the two sound receivers. The microcontroller includes a low-frequency sound signal analysis module, a computing module, and a low-frequency sound signal processing module. The low-frequency sound signal analysis module is used for determining and acquiring a plurality of sound source position data according to a phase difference between a plurality of sound frames of at least one position low-frequency sound signal of the first sound signal and a plurality of sound frames of at least one position low-frequency sound signal of the second sound signal. The computing module is used for determining a probability that a main direction of the input sound is in accordance with a target orientation according to each of the sound source position data. The low-frequency sound signal processing module is used for adjusting, according to the probability, the sound volume of low-frequency sound signals of the first sound signal and the second sound signal being outputted.

In certain embodiments, the higher the probability is, the lesser the sound volume of the low-frequency sound signals of the first sound signal and the second sound signal being outputted is adjusted and lowered.

In certain embodiments, the frequency of the at least one position low-frequency sound signal is X Hz, and $500 \leq X \leq 1500$.

In certain embodiments, a quantity of the at least one position low-frequency sound signal is plural, and the frequency of the low-frequency sound signal of the first sound signal and the frequency of the low-frequency sound signal of the second sound signal are below 4000 Hz.

In certain embodiments, the microcontroller further comprises a filtering module, used for recording a sound volume change of the low-frequency sound signals of the first sound signal and the second sound signal and performing a smoothing process.

In certain embodiments, the detection device is provided to be assembled to a car, a quantity of the peripheral object detected by the detection device is more than one, and the detection device is allowed to simultaneously obtain the instant positions of the peripheral objects. The objects include a car, a motorcycle, and a pedestrian. The indoor map stored in the storing member is a parking lot map, and the navigation request signal is a parking navigation request signal.

In certain embodiments, a quantity of the detection device of the indoor navigation system is more than one, and each of the detection devices is electrically coupled to the path planning apparatus through the Bluetooth transceiver thereof. The calculating unit is configured to match the instant positions of the detection devices and the instant positions of the peripheral objects with the indoor map so as to obtain the indoor navigation path satisfying the navigation request signal.

In further another aspect, the present disclosure provides a detection device for being wirelessly coupled to a path planning apparatus. The detection device includes two detection modules configured to be operated at the same time. Each of the two detection modules includes a speaker, a sound receiver, and a signal converting circuit. The sound receiver is configured to continuously receive an external sound generated from a peripheral object in movement so as to obtain an input signal. The signal converting circuit is electrically coupled to the sound receiver. The signal converting circuit is configured to convert the input signal from the sound receiver into a target spectrogram. In the detection device, the two spectrograms respectively converted from the two signal converting circuits have a time/phase difference there-between. At least one of the two detection modules includes a storage unit, a judging circuit, and a Bluetooth transceiver. The storage unit has a plurality of basic spectrograms therein that respectively correspond to sounds respectively generated from different kinds of objects in movement. The judging circuit is electrically coupled to the storage unit, the two signal converting circuits, and the two speakers. The judging circuit is configured to compare any one of the two target spectrograms with the basic spectrograms so as to determine which kind of the objects the peripheral object is, and is configured to obtain an instant position of the peripheral object by the time/phase difference. The Bluetooth transceiver is electrically coupled to the judging circuit. The detection device is configured to transmit an instant position of the detection device and the instant position of the peripheral object to the path planning apparatus through the Bluetooth transceiver.

Therefore, the detection device of the present disclosure can be used to detect an instant position of a peripheral object by using a sound generated from the peripheral object, so that a detection range of the detection device can be broader than cameras.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
FIG. 1 is a schematic view showing an operation of a wearable device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
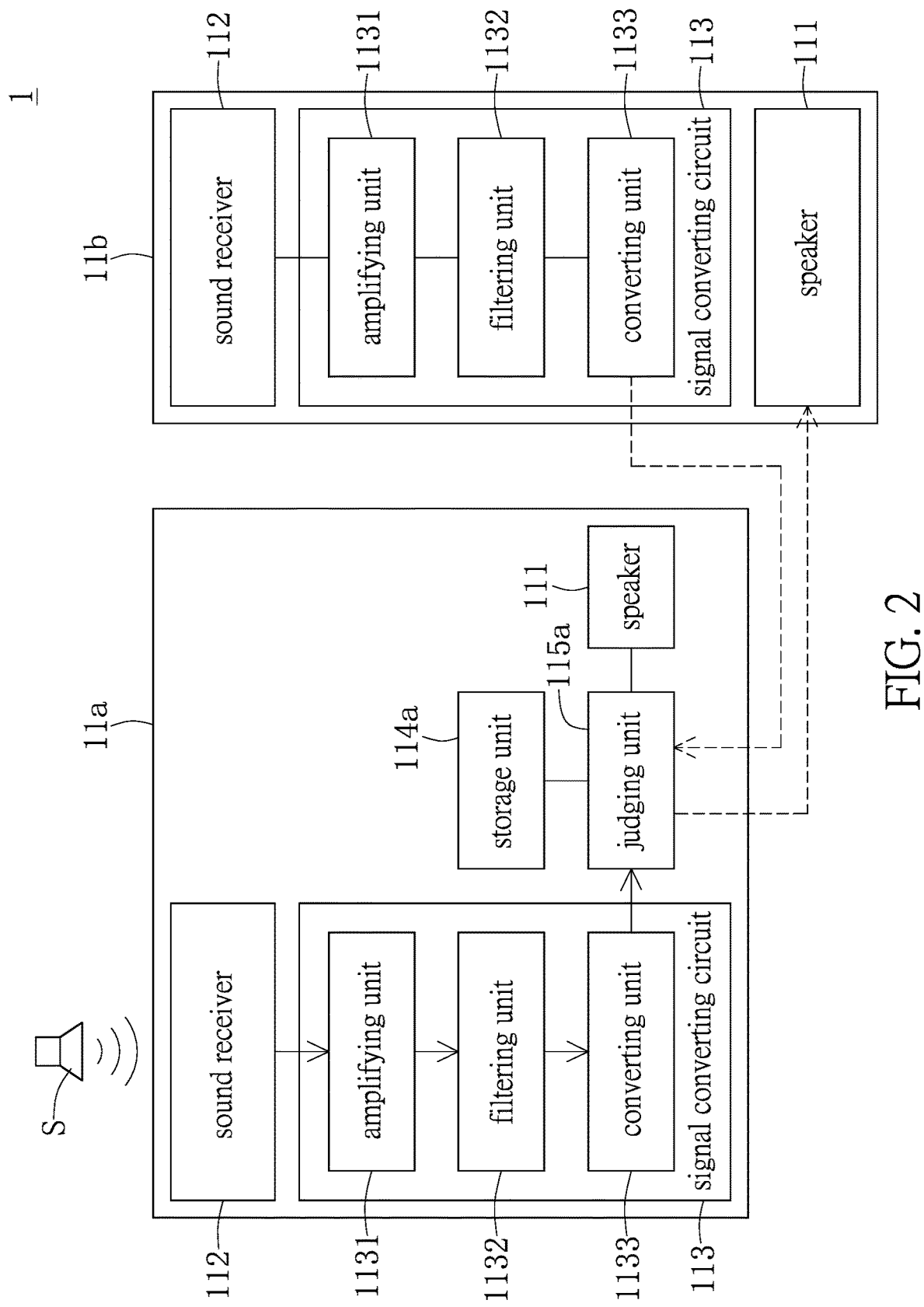
FIG. 2 is a functional block view of the wearable device according to the first embodiment of the present disclosure.
Figure 3:
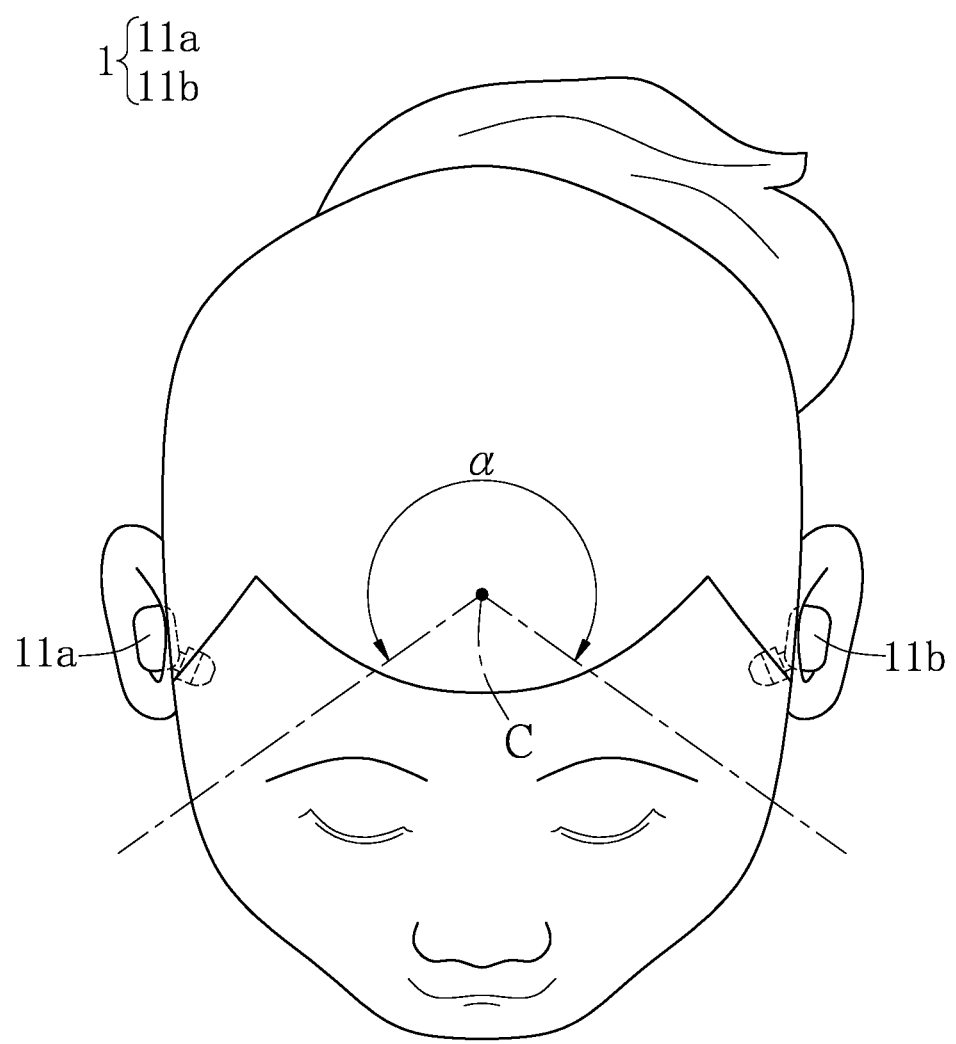
FIG. 3 is a top view showing the operation of the wearable device according to the first embodiment of the present disclosure.

Referring to FIG. 1 to FIG. 3, a first embodiment of the present disclosure provides a wearable device 1 that includes two wireless earphones 11a, 11b configured as a pair and to be operated at the same time. In other words, any earphones having a wire or any wireless earphones not be operated at the same time are different from the two wireless earphones 11a, 11b (or the wearable device 1) of the present embodiment.

Each of the two wireless earphones 11a, 11b includes a speaker 111, a sound receiver 112, and a signal converting circuit 113 that is electrically coupled to the sound receiver 112. However, in other embodiments of the present disclosure, the wireless earphone 11a, 11b can include other components according to design requirements.

As the speaker 111, the sound receiver 112, and the signal converting circuit 113 of the two wireless earphones 11a, 11b are of the same structure, the following description describes the structure of the speaker 111, the sound receiver 112, and the signal converting circuit 113 of just one of the two wireless earphones 11a, 11b for the sake of brevity, but the present disclosure is not limited thereto. For example, in other embodiments of the present disclosure, the speaker 111, the sound receiver 112, or the signal converting circuit 113 of the two wireless earphones 11a, 11b can be of different structure.

In the present embodiment, the speaker 111 can be used to emit sound (e.g., music) in a general operation, and the sound receiver 112 is configured to continuously receive an external sound S generated from a peripheral object O in movement so as to obtain an input signal. Moreover, the peripheral object O in the present embodiment can emit a predictable or general sound. For example, the peripheral object O can be a car, a motorcycle, a bicycle, or a runner.

Specifically, the speaker 111 is configured to generate a soundwave to delete a noise that is received by the sound receiver 112 and includes the external sound S. In other words, the speaker 111 allows a user to only hear the sound (e.g., music) in the general operation, but the present disclosure is not limited thereto. For example, in other embodiments of the present disclosure, the speaker 111 can be provided without deleting the noise.

Moreover, the sound receiver 112 can obtain the input signal according to the external sound S before the speaker deletes the noise. In the present embodiment, the sound receiver 112 can include at least one omnidirectional microphone, but the present disclosure is not limited thereto. For example, in other embodiments of the present disclosure, the sound receiver 112 can include at least one directional microphone or a microphone array according to design requirements.

The signal converting circuit 113 is electrically coupled to the sound receiver 112, and the signal converting circuit 113 is configured to convert the input signal from the sound receiver 112 into a target spectrogram. It should be noted that different sounds respectively have different acoustic features, and a difference between different acoustic features is not easily found according to waveforms in time domain mapped by the different sounds, so that the waveforms in time domain need to be converted into spectrums in frequency domain for finding the difference between different acoustic features. In other words, the difference between different acoustic features is only shown in the spectrums in frequency domain.

In the present embodiment, when the sound receiver 112 receives the external sound S, the sound receiver 112 also receives other irrelevant noise, and an output voltage of the sound receiver 112 is small, so that a sound signal received by the sound receiver 112 is not easily to distinguish the external sound S from the irrelevant noise. Accordingly, the signal converting circuit 113 in the present embodiment includes an amplifying unit 1131 electrically coupled to the sound receiver 112, a filtering unit 1132 electrically coupled to the amplifying unit 1131, and a converting unit 1133 that is electrically coupled to the filtering unit 1132.

Specifically, after the sound receiver 112 receives the sound signal, the signal converting circuit 113 can amplify the sound signal through the amplifying unit 1131 (e.g., a second-order amplifier circuit). Moreover, the sound signal is amplified, and the noise is also amplified together, so that the signal converting circuit 113 can filter unnecessary noise through the filtering unit 1132 (e.g., a band-pass filter formed by a high-pass filter and a low-pass filter). Accordingly, the signal converting circuit 113 can convert the sound signal, which is filtered by the filtering unit 1132, into the target spectrogram through the converting unit 1133.

In the wearable device 1, the two wireless earphones 11*a*, 11*b* are respectively worn on the user's ears, so that the two spectrograms respectively converted from the two signal converting circuits 113 have a time/phase difference therebetween.

Specifically, in the present embodiment, one of the two wireless earphones 11*a* includes a storage unit 114*a* and a judging unit 115*a*, but the present disclosure is not limited thereto. For example, in other embodiments of the present disclosure, each of the two wireless earphones 11*a*, 11*b* can include a storage unit 114*a* and a judging unit 115*a*; or, the storage unit 114*a* and the judging unit 115*a* are respectively arranged in the two wireless earphones 11*a*, 11*b*. Accordingly, in the wearable device 1 of the present disclosure, at least one of the two wireless earphones 11*a*, 11*b* includes the storage unit 114*a* and the judging unit 115*a*.

The storage unit 114*a* has a visual geometry group (VGG) training model therein, and has a plurality of basic spectrograms therein. The basic spectrograms respectively correspond to sounds respectively generated from different kinds of objects (e.g., a car, a motorcycle, a bicycle, and a runner) in movement, and the basic spectrograms can be generated by the VGG training model. Specifically, the VGG training model is configured to selectively modify the basic spectrograms according to the target spectrograms, but the present disclosure is not limited thereto. For example, in other embodiments of the present disclosure, the storage unit 114*a* can be provided without the VGG training model.

The judging unit 115*a* is electrically coupled to the storage unit 114*a*, the two signal converting circuits 113, and the two speakers 111. The judging unit 115*a* is electrically coupled to the converting unit 1133 of each of the two wireless earphones 11*a*, 11*b*, so that the judging circuit 115*a* is configured to compare any one of the two target spectrograms with the basic spectrograms so as to determine which kind of the objects the peripheral object O is.

For example, the judging unit 115*a* can compare the target spectrogram with any one of the basic spectrograms so as to obtain a likelihood value, and the judging unit 115*a* further choses a largest one from the likelihood values those greater than a predetermined value (e.g., 85%), so that the judging unit 115*a* can determine that the peripheral object O is the kind of the object corresponding to the basic spectrogram that is related to the largest likelihood value. Specifically, if the likelihood values obtained by comparing the target spectrogram with the basic spectrograms respectively corresponding to a car, a motorcycle, a bicycle, and a runner are 90%, 95%, 80%, and 60%, the two likelihood values of 90% and 95% are greater than the predetermined value (e.g., 85%), and the likelihood value of 95% is the largest one, so that judging unit 115*a* can determine that the peripheral object O is the motorcycle.

Moreover, the judging unit 115*a* can be configured to obtain an instant position of the peripheral object O (e.g., a velocity and an orientation of the peripheral object O) by the time/phase difference. For example, the external sound S can reach the two sound receivers 112 at a time difference that can be calculated by the judging unit 115*a*, and the instant position of the peripheral object O can be obtained by a geometric relationship of the external sound S and the two sound receivers 112.

Specifically, when the instant position of the peripheral object O is located in a predetermined region R around the wearable device 1, the judging unit 115*a* allows the speaker 111 of at least one the two wireless earphones 11*a*, 11*b* to emit a warning sound. It should be noted that the predetermined region R in the present embodiment is not a fixed value and can be changed according to the kind or velocity of the peripheral object O. For example, the predetermined region R when the peripheral object O is a car is larger than the predetermined region R when the peripheral object O is a bicycle. In addition, when the velocity of the peripheral object O is faster, the corresponding predetermined region R is larger.

Accordingly, when the user wears the two wireless earphones 11*a*, 11*b* to listen music, the wearable device 1 can immediately provide a warning signal when the user's surroundings may affect safety, thereby increasing the security of the wearable device 1 in use.

The sound receiver 112 of the two wireless earphones 11*a*, 11*b* in the present embodiment are defined to be operated at a horizontal plane, the predetermined region R has a detecting angle α in the horizontal plane with respect to a center point C between the two wireless earphones 11*a*, 11*b*, and the detecting angle α is less than 300 degrees and is preferably located at an invisible region of user's eyes.

Second Embodiment

Figure 4:
FIG. 4 is a schematic view showing an operation of a portable apparatus according to a second embodiment of the present disclosure.
Figure 5:
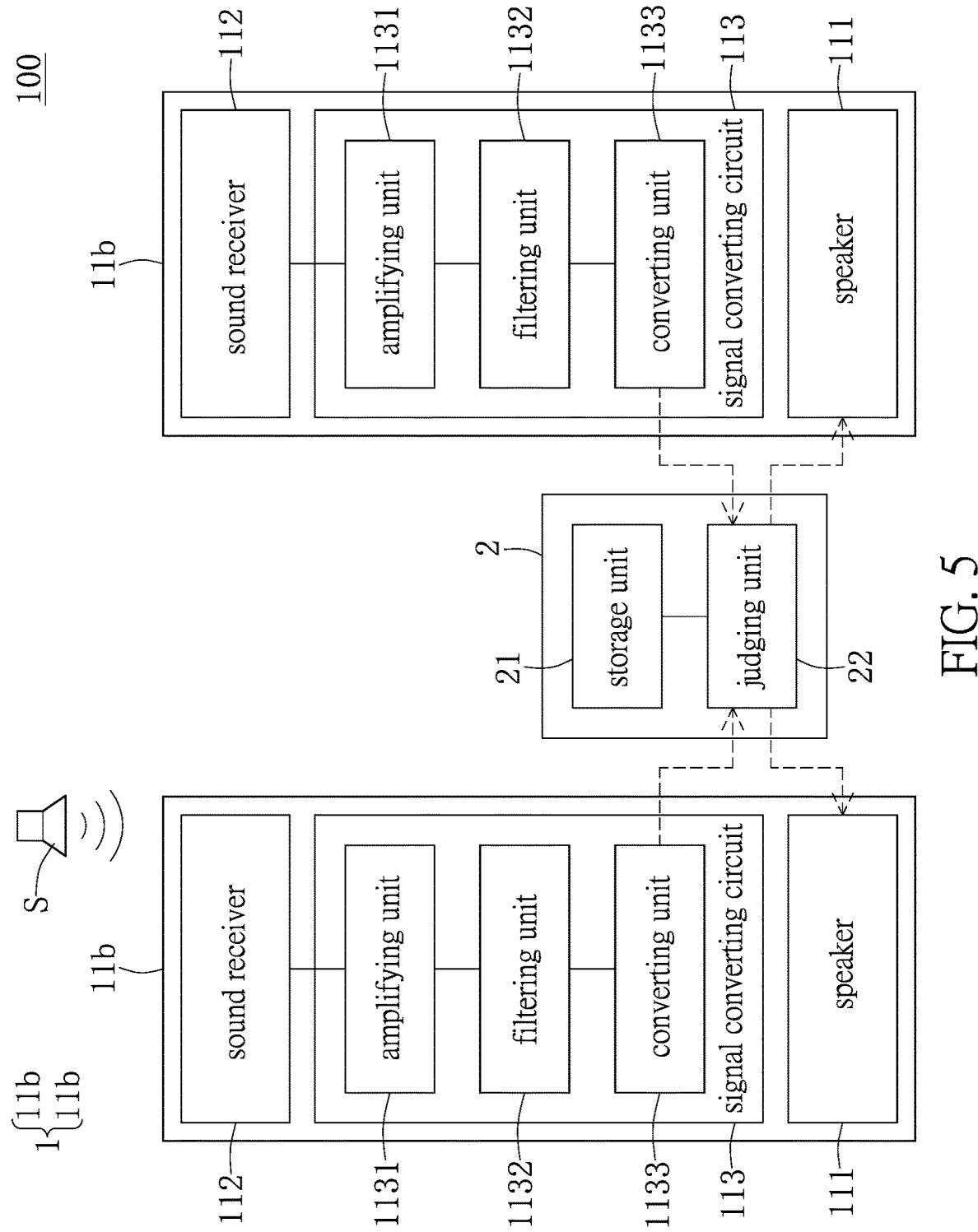
FIG. 5 is a functional block view of the portable apparatus according to the second embodiment of the present disclosure.

Referring to FIG. 4 and FIG. 5, a second embodiment of the present disclosure is similar to the first embodiment of the present disclosure. For the sake of brevity, descriptions of the same components in the first and second embodiments of the present disclosure will be omitted, and the following description only discloses different features between the first and second embodiments.

The present embodiment of the present disclosure provides a portable apparatus 100, which includes a wearable device 1 and a smart phone 2. The wearable device 1 includes two wireless earphones 11*b* configured as a pair and to be operated at the same time, and each of the two wireless earphones 11*b* includes a speaker 111, a sound receiver 112, and a signal converting circuit 113 electrically coupled to the sound receiver 112. The speaker 111, the sound receiver 112, and the signal converting circuit 113 of the wireless earphone 11*b* in the present embodiment are similar to that in the first embodiment so that descriptions of speaker 111, the sound receiver 112, and the signal converting circuit 113 in the present embodiment are omitted for the sake of brevity. Moreover, each of the two wireless earphones 11*b* in the present embodiment is provided without the storage unit 114*a* and the judging unit 115*a* of the first embodiment.

The smart phone 2 is wirelessly connected to the two wireless earphones 11*b*, and the smart phone 2 includes a storage unit 21 and a judging unit 22. The storage unit 21 and the judging unit 22 in the present embodiment can be existing components built in the smart phone 2, so that the smart phone 2 is not need to add new components, but the present disclosure is not limited thereto. Moreover, functions of the storage unit 21 and the judging unit 22 in the present embodiment are identical to that of the storage unit 21 and the judging unit 22 in the first embodiment, so that descriptions of the storage unit 21 and the judging unit 22 in the present embodiment are omitted for the sake of brevity.

Third Embodiment

Figure 6:
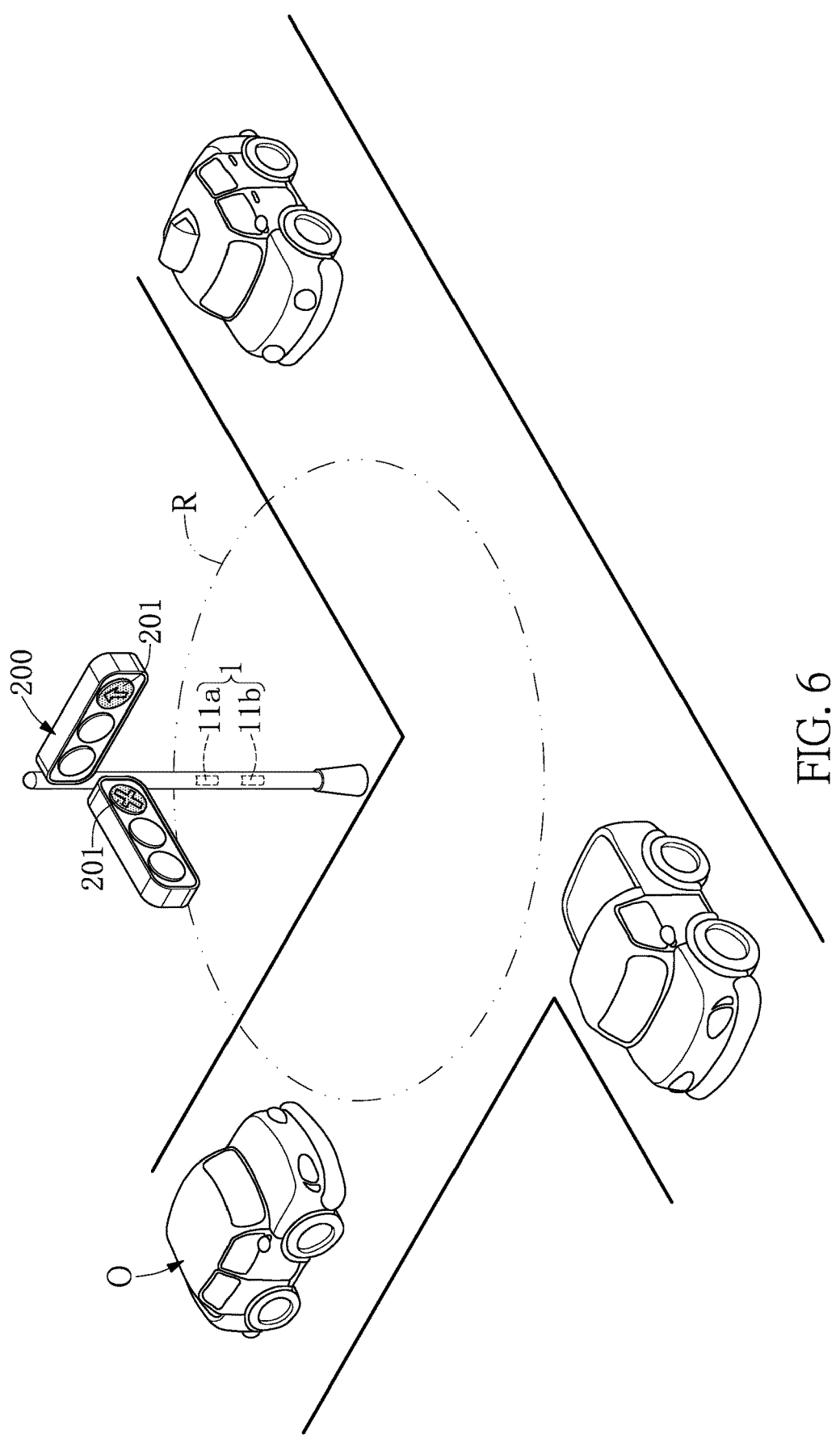
FIG. 6 is a schematic view showing a detection device applied to a traffic light device according to a third embodiment of the present disclosure.
Figure 7:
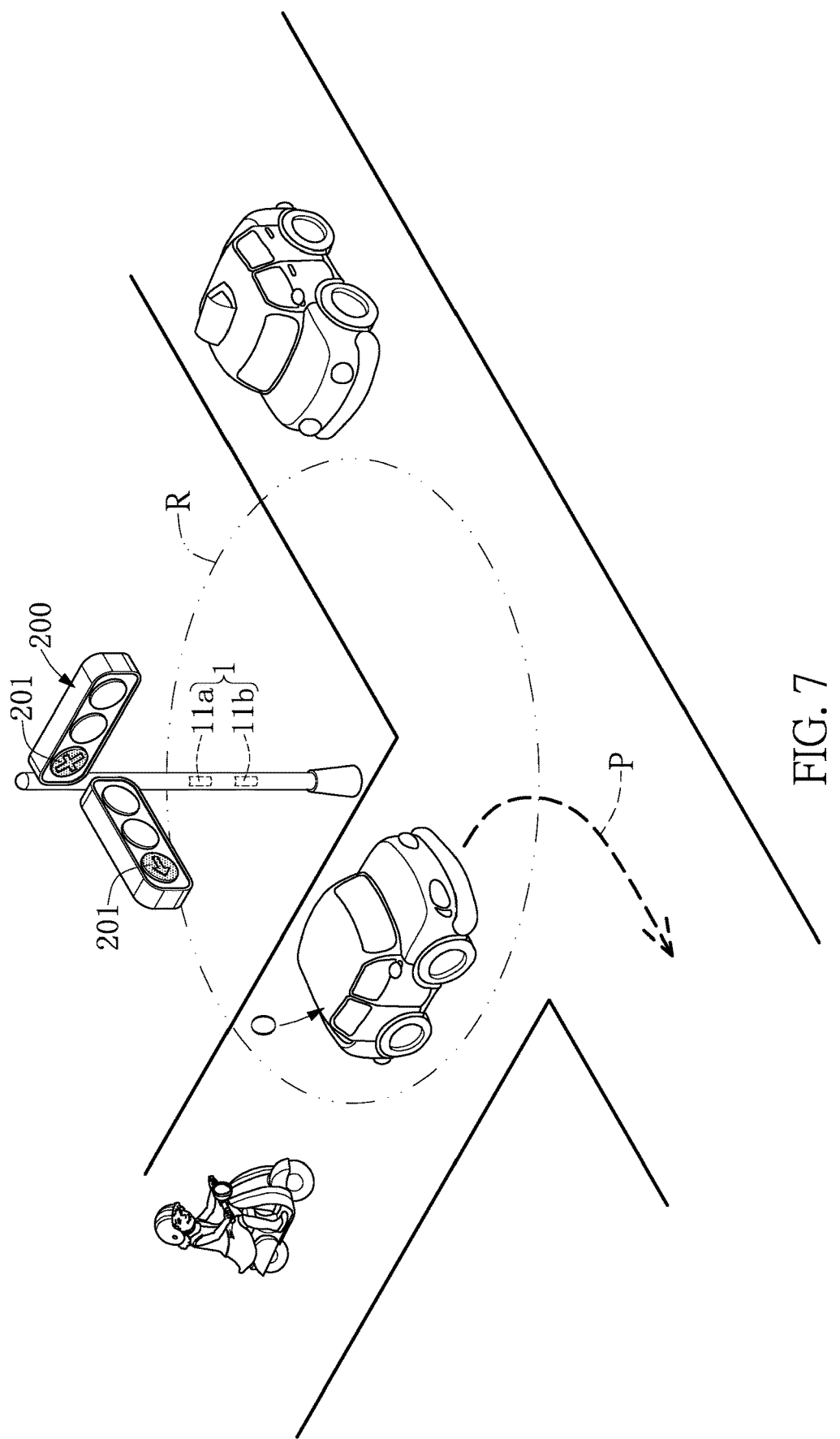
FIG. 7 is a schematic view showing an operation of the detection device according to the third embodiment of the present disclosure.

Referring to FIG. 6 and FIG. 7, a third embodiment of the present disclosure is similar to the first embodiment of the present disclosure. For the sake of brevity, descriptions of the same components in the first and third embodiments of the present disclosure will be omitted, and the following description only discloses different features between the first and third embodiments.

The present embodiment of the present disclosure provides a detection device 1. The function of the detection device 1 of the present embodiment is substantially identical to that of the wearable device 1 of the first embodiment, but the structural design of the detection device 1 of the present embodiment can be adjusted or changed according to practical requirements.

Specifically, the detection device 1 includes two detection modules 11a, 11b that are configured to be operated at the same time, and the functions of the two detection modules 11a, 11b are substantially identical to that of the two wireless earphones 11a, 11b of the first embodiment.

Moreover, the detection device 1 of the present embodiment is provided for being assembled to a traffic light device 200 having a plurality of traffic lights 201, so that the peripheral objects O detected by the detection device 1 of the present embodiment are associated with the traffic light device 200, and the objects can include a car and a motorcycle, but the present disclosure is not limited thereto.

Specifically, the detection device 1 of the present embodiment is configured to transmit the instant position of the peripheral object O to the signal light device 200, so that the traffic lights 201 of the traffic light device 200 are changeable according to the instant position of the peripheral object O. For example, when the instant position of the peripheral object O located in a predetermined region R (e.g., the predetermined region R is near to the traffic light device 200) is detected by the detection device 1, the detection device 1 would transmit the instant position of the peripheral object O to the traffic light device 200, and the traffic lights 201 of the traffic light device 200 can be changed for allowing the peripheral object O to travel through the traffic light device 200.

In addition, in other embodiment of the present disclosure, a quantity of the peripheral objects O detected by the detection device 1 can be more than one, and the detection device 1 can simultaneously obtain instant positions of the peripheral objects O.

Fourth Embodiment

Figure 8:
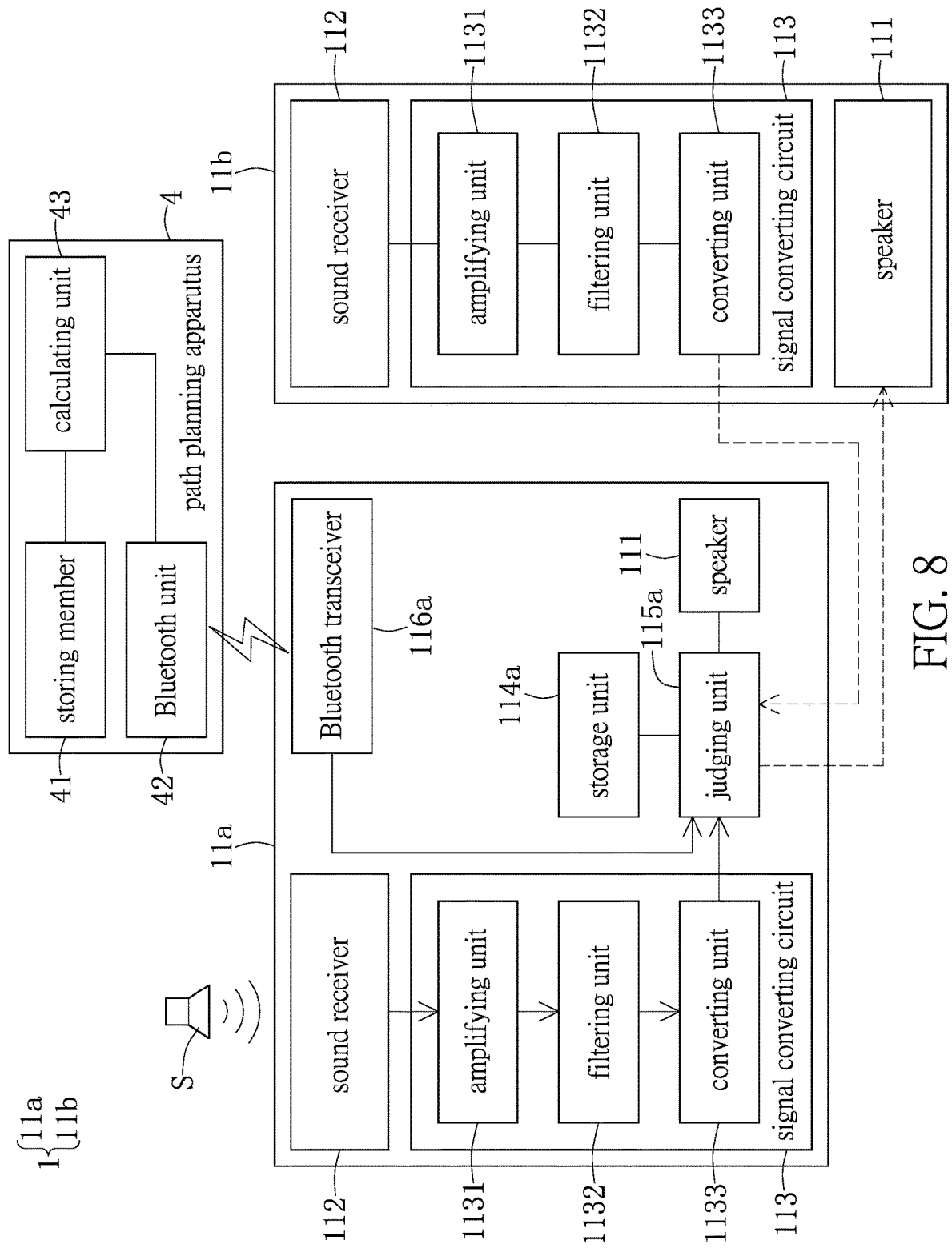
FIG. 8 is a functional block view of an indoor navigation system according to a fourth embodiment of the present disclosure.
Figure 9:
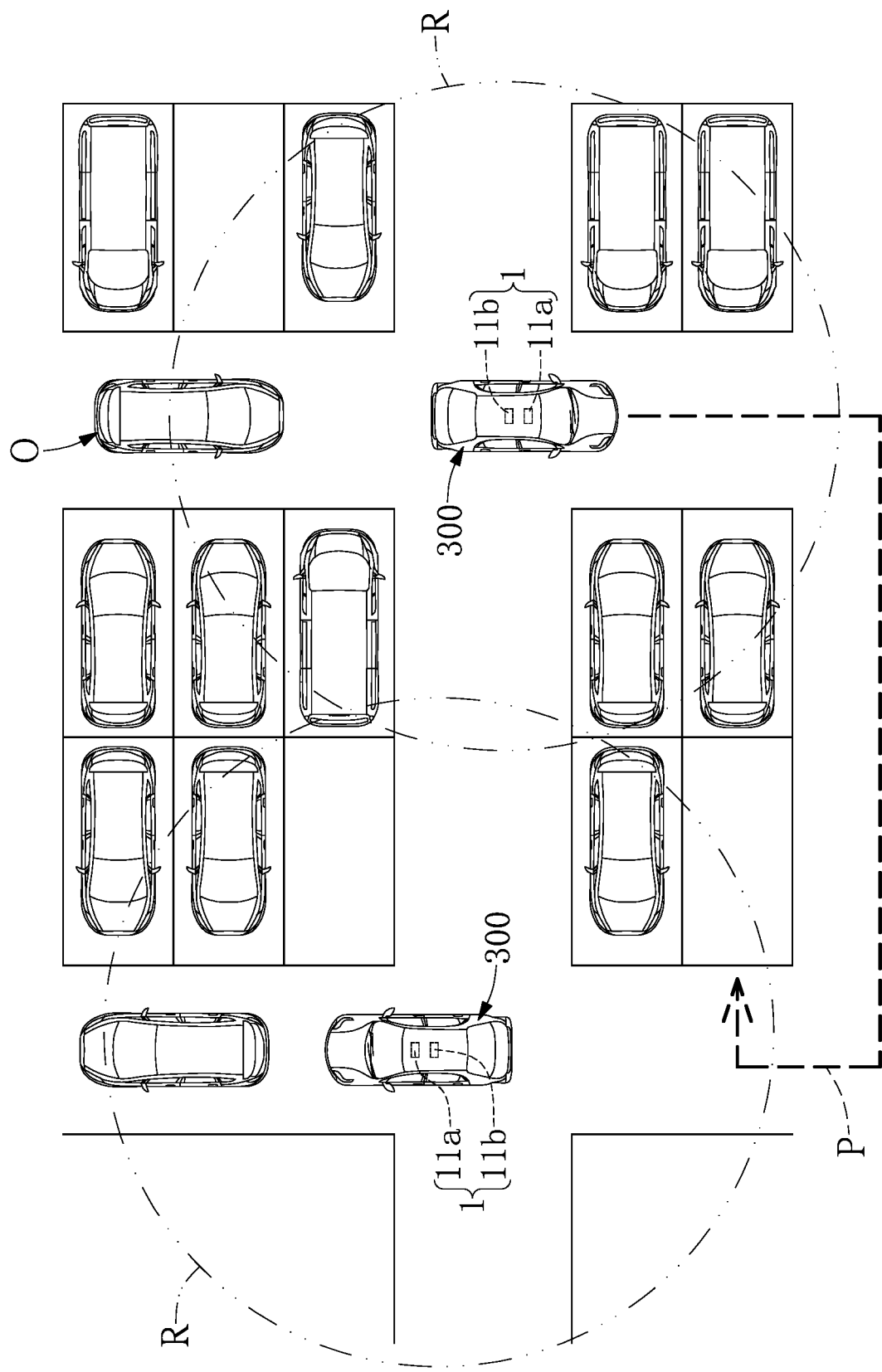
FIG. 9 is a schematic view showing a detection device of the indoor navigation system applied to a parking lot according to the fourth embodiment of the present disclosure.

Referring to FIG. 8 and FIG. 9, a fourth embodiment of the present disclosure is similar to the first embodiment of the present disclosure. For the sake of brevity, descriptions of the same components in the first and fourth embodiments of the present disclosure will be omitted, and the following description only discloses different features between the first and fourth embodiments.

The present embodiment of the present disclosure provides an indoor navigation system including a detection device 1 and a path planning apparatus 4. The function of the detection device 1 of the present embodiment is substantially identical to that of the wearable device 1 of the first embodiment. Specifically, the detection device 1 includes two detection modules 11a, 11b that are configured to be operated at the same time, and the functions of the two detection modules 11a, 11b are substantially identical to that of the two wireless earphones 11a, 11b of the first embodiment. Moreover, the detection module 11a of the detection device 1 in the present embodiment further includes a Bluetooth transceiver 116a electrically coupled to the judging circuit 115a.

The following description describes the function and structure of the path planning apparatus 4, and then describes the applied field of the path planning apparatus 4. Specifically, the path planning apparatus 4 includes a storing member 41, a Bluetooth unit 42, and a calculating unit 43 that is electrically coupled to the storing member 41 and the Bluetooth unit 42. The storing member 41 has an indoor map and a related information. The Bluetooth unit 42 is wirelessly coupled to the Bluetooth transceiver 116a of the detection device 1 for receiving an instant position of the detection device 1 and the instant position of the peripheral object O. In other words, the detection device 1 of the present embodiment is configured to transmit an instant position of the detection device 1 and the instant position of the peripheral object O to the path planning apparatus 4 through the Bluetooth transceiver 116a.

Moreover, the detection device 1 is configured to transmit a navigation request signal to the path planning apparatus 4 through the Bluetooth transceiver 116a and Bluetooth unit 42. The calculating unit 43 is configured to match the instant position of the detection device 1 and the instant position of the peripheral object O with the indoor map so as to obtain an indoor navigation path P satisfying the navigation request signal. In other words, the indoor navigation path P is planned to bypass the instant position of the detection device 1 and the instant position of the peripheral object O as much as possible, thereby saving user's time. Accordingly, the path planning apparatus 4 is configured to transmit the indoor navigation path P to the detection device 1 through the Bluetooth unit 42.

In the present embodiment, the indoor map stored in the storing member 41 is a parking lot map, the related information can be vacant places in the parking lot, and the navigation request signal is a parking navigation request signal. The detection device 1 is provided to be assembled to a car 300, a quantity of the peripheral object O detected by the detection device can be more than one, and the detection device 1 is allowed to simultaneously obtain the instant positions of the peripheral objects O. The objects include a car, a motorcycle, and a pedestrian.

In addition, a quantity of the detection device 1 of the indoor navigation system can be more than one, and each of the detection devices 1 is electrically coupled to the path planning apparatus 4 through the Bluetooth transceiver 116a thereof. Specifically, the calculating unit 43 is configured to match the instant positions of the detection devices 1 and the instant positions of the peripheral objects O with the indoor map so as to obtain the indoor navigation path P satisfying the navigation request signal.

Fifth Embodiment

Figure 10:
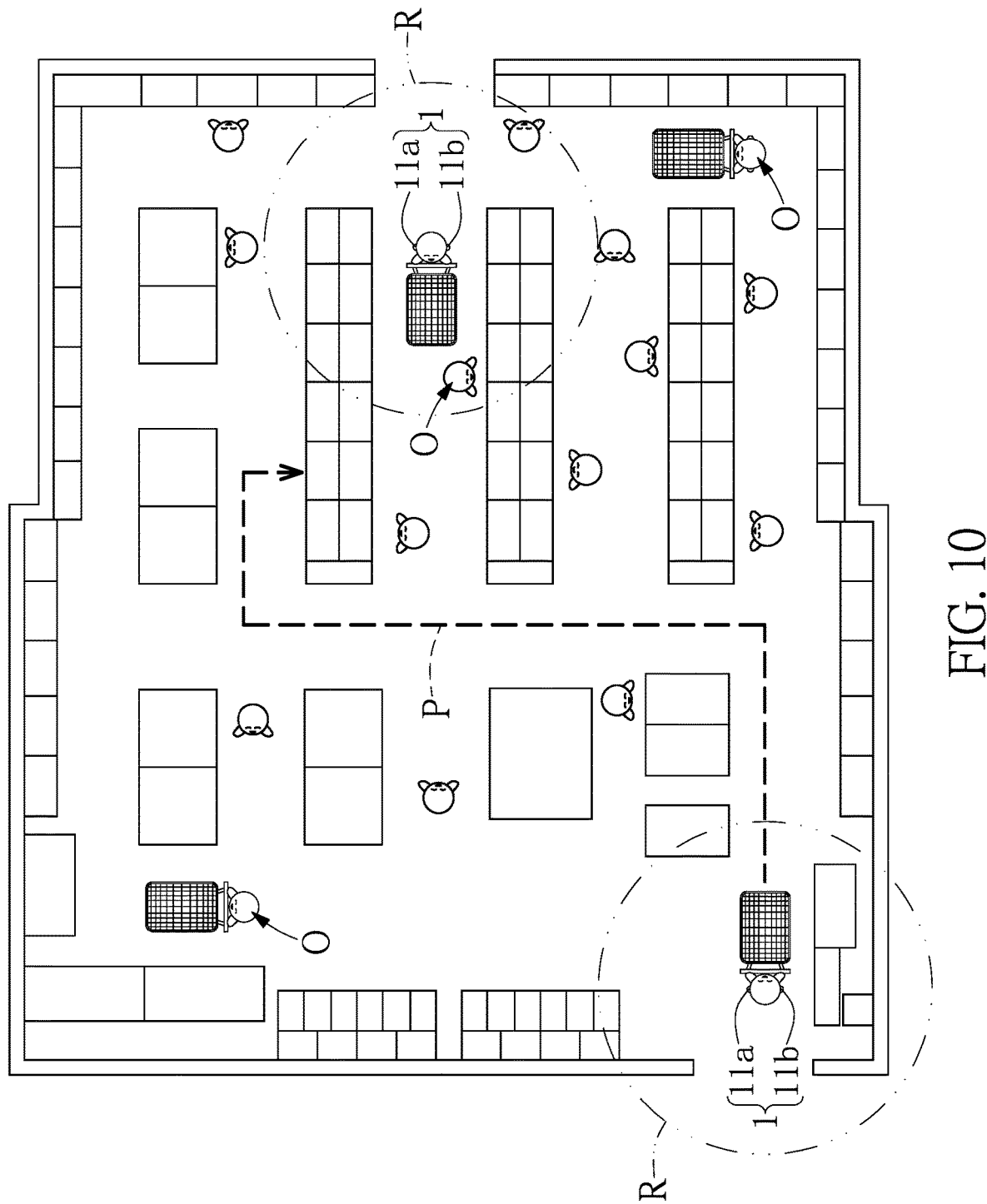
FIG. 10 is a schematic view showing a detection device of the indoor navigation system applied to a market according to a fifth embodiment of the present disclosure.

Referring to FIG. 10, a fifth embodiment of the present disclosure is similar to the fourth embodiment of the present disclosure. For the sake of brevity, descriptions of the same components in the fourth and fifth embodiments of the present disclosure will be omitted, and the following description only discloses different features between the fourth and fifth embodiments.

In the present embodiment, the indoor map stored in the storing member 41 is a market map, the related information can be product arrangement in the market, and the navigation request signal is a shopping navigation request signal. Moreover, the two detection modules 11a, 11b are two wireless earphones that are configured as a pair, a quantity of the peripheral object O detected by the detection device 1 is more than one, and the detection device 1 is allowed to simultaneously obtain the instant positions of the peripheral objects O, and the objects include a shopping cart and a pedestrian.

In addition, a quantity of the detection device 1 of the indoor navigation system can be more than one, and each of the detection devices 1 is electrically coupled to the path planning apparatus 4 through the Bluetooth transceiver 116a thereof. Furthermore, the calculating unit 43 is configured to match the instant positions of the detection devices 1 and the instant positions of the peripheral objects O with the indoor map so as to obtain the indoor navigation path P satisfying the navigation request signal.

Sixth Embodiment

Figure 11:
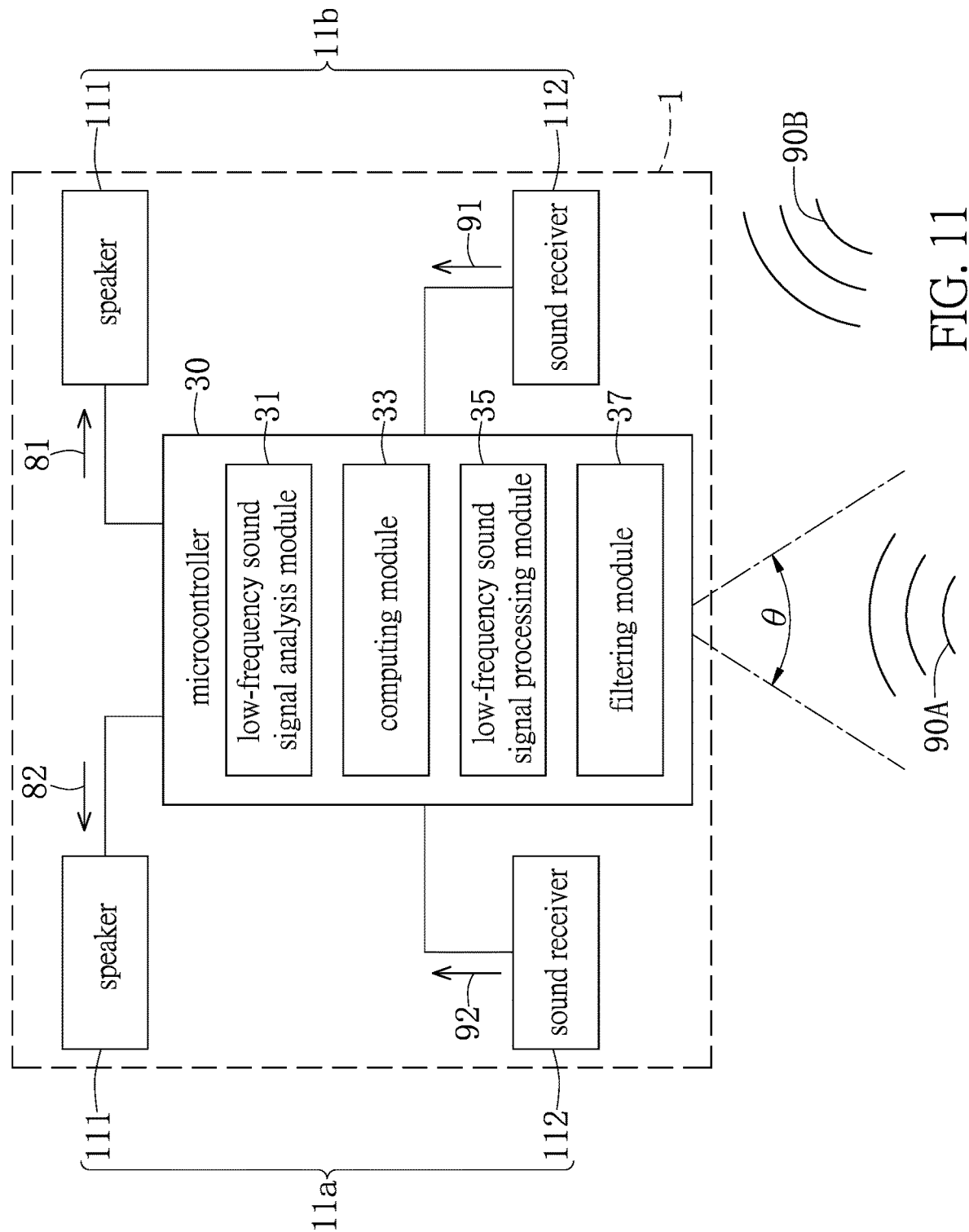
FIG. 11 is a functional block view of a detection device according to a sixth embodiment of the present disclosure.
Figure 12:
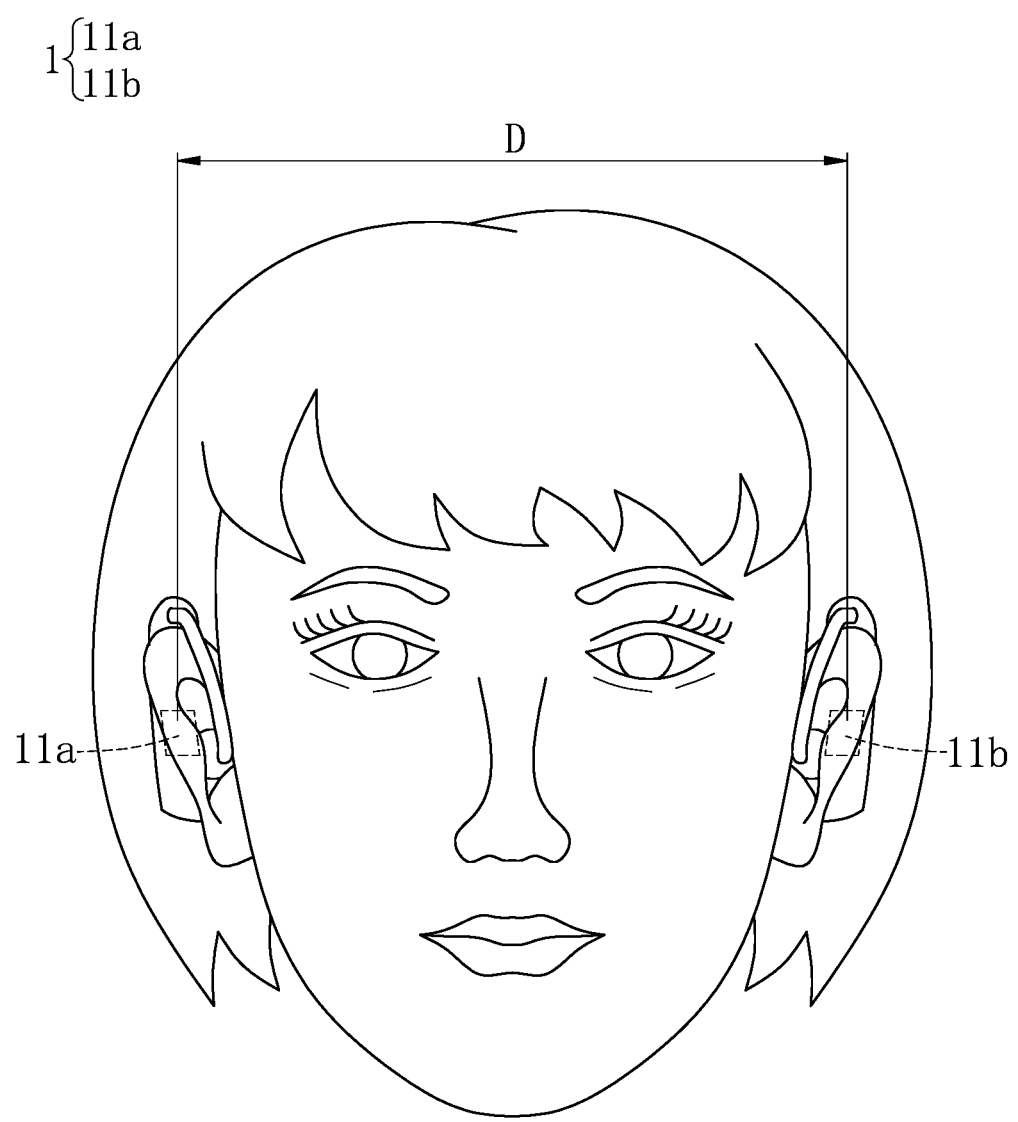
FIG. 12 is a schematic view showing an operation of the detection device according to the sixth embodiment of the present disclosure.
Figure 13:
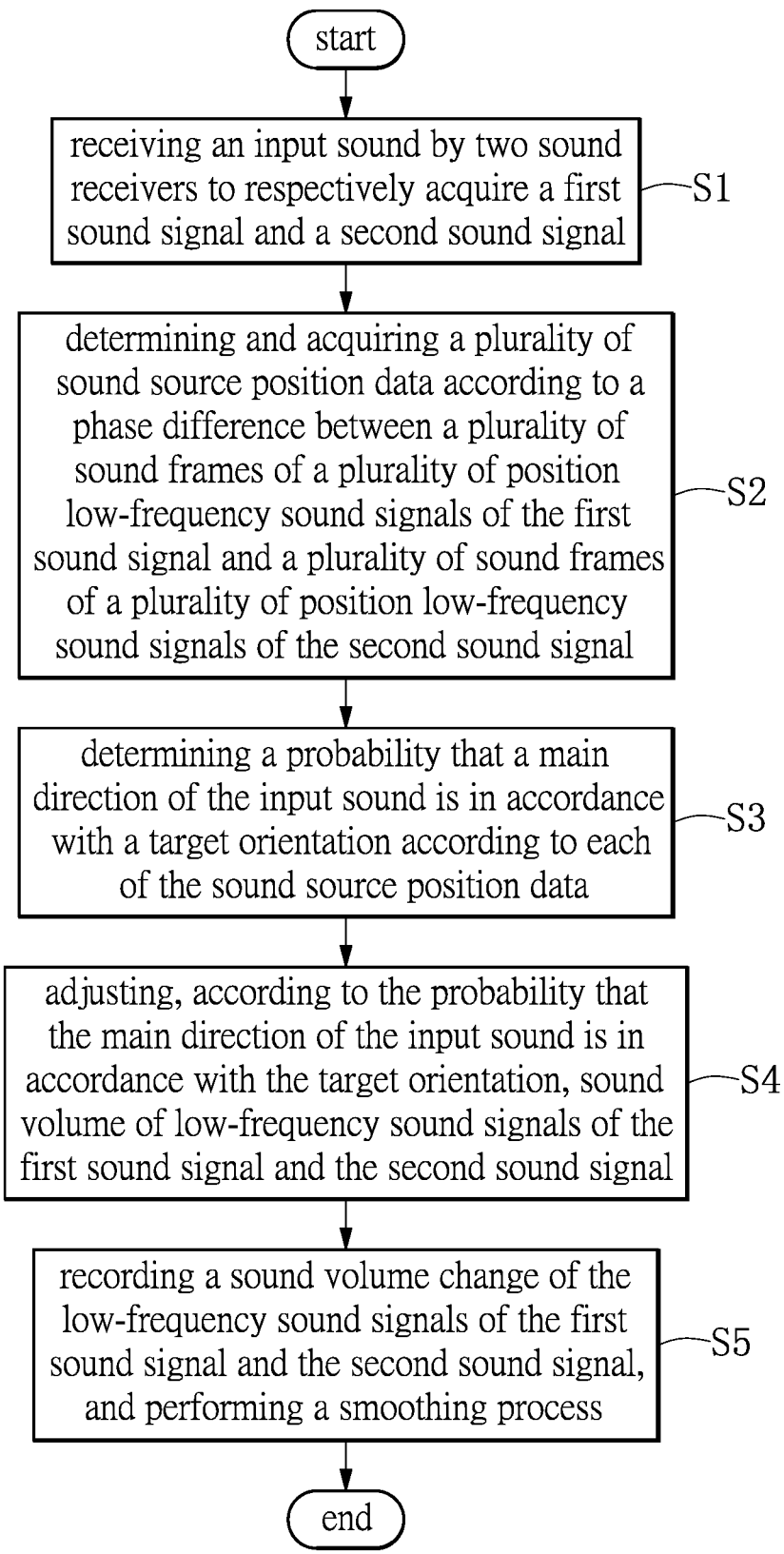
FIG. 13 is a flowchart showing of a method of decreasing the effect of an interference sound according to the sixth embodiment of the present disclosure.

Referring to FIG. 11 to FIG. 13, a sixth embodiment of the present disclosure is similar to the fifth embodiment of the present disclosure. For the sake of brevity, descriptions of the same components in the fifth and sixth embodiments of the present disclosure will be omitted, and the following description only discloses different features between the fifth and sixth embodiments.

As shown in FIG. 11 and FIG. 12 of the present embodiment, the detection device 1 further includes a microcontroller 30 electrically connected to the two sound receivers 112, and the microcontroller 30 can be arranged in one of the two detection modules 11a, 11b, but the present disclosure is not limited thereto. Moreover, when a user wears the two detection modules 11a, 11b, the two sound receivers 112 will be respectively located next to the left ear and the right ear of the user. At this time, a distance D between the two sound receivers 112 is around 10 to 30 centimeters, which is approximately equal to the width of a human face (or human head).

The two sound receivers 112 can receive an input sound 90A or 90B from an external environment. After the two sound receivers 10 receive the input sound 90A or 90B, the two sound receivers 10 will respectively generate and acquire a first sound signal 91 and a second sound signal 92.

Specifically, the microcontroller 30 includes a low-frequency sound signal analysis module 31, a computing module 33, a low-frequency sound signal processing module 35, and a filtering module 37. Please note that each of the abovementioned modules can be accomplished by a hardware device, a software program, a firmware or a combination thereof, and that it can also be configured in the form of a circuit loop or other suitable format. Furthermore, each of the modules can be configured either in an independent form or in a combined form. In one preferred embodiment, each of the modules is a software program which can be stored in a memory (not shown in the figures) of the microcontroller 30 such that a processor (not shown in the figures) of the microcontroller 30 can execute each of the modules to achieve the object of the present disclosure. Moreover, the embodiment disclosed herein only describes a preferred embodiment of the present disclosure. To avoid redundant description, not all possible variations and combinations are described in detail in this specification. However, those skilled in the art will understand that the above modules or components are not all necessary parts. Also, to implement the present disclosure, other more detailed known modules or components might also be included. It is possible that each module or component can be omitted or modified depending on different requirements, and it is also possible that other modules or components might be disposed between any two of the modules.

In the present embodiment of the present disclosure, the low-frequency sound signal analysis module 31 is used for determining and acquiring a plurality of sound source position data according to a phase difference between a plurality of sound frames of a plurality of position low-frequency sound signals of the first sound signal 91 and a plurality of sound frames of a plurality of position low-frequency sound signals of the second sound signal 92. Specifically, the frequency of the position low-frequency sound signal is, but not limited to, between 500 Hz and 1500 Hz. The process of the low-frequency sound signal analysis module 51 determining and acquiring the sound source position data will be described in more detail below; therefore, there is no need for further description in this paragraph.

In the present embodiment of the present disclosure, the computing module 33 is used for determining a probability that a main direction of the input sound 90A or 90B is in accordance with a target orientation according to each of the sound source position data. The process of the computing module 33 determining the probability that the main direction of the input sound 90A or 90B is in accordance with the target orientation will be described in more detail below; therefore, there is no need for further description in this paragraph.

In the present embodiment of the present disclosure, the low-frequency sound signal processing module 35 is used for adjusting, according to the probability that the main direction of the input sound 90A or 90B is in accordance with the target orientation, the sound volume of low-frequency sound signals of the first sound signal 91 and the second sound signal 92 being outputted. The higher the probability that the main direction of the input sound 90A or 90B is in accordance with the target orientation is, the lesser the sound volume of the low-frequency sound signals of the first sound signal 91 and the second sound signal 92 being outputted is adjusted and lowered. Specifically, the low-frequency sound signals refers to, without limiting the scope of the present disclosure, a sound signal with a frequency below 4000 Hz. The process of adjusting the sound volume of the sound signal according to the probability will be described in more detail below; therefore, there is no need for further description in this paragraph.

In the present embodiment of the present disclosure, the filtering module 37 is used for recording a sound volume change of the low-frequency sound signals of the first sound signal 91 and the second sound signal 92 and performing a smoothing process. The process of performing the smoothing process on the low-frequency sound signals will be described in more detail below; therefore, there is no need for further description in this paragraph.

In the present embodiment of the present disclosure, one of the two speakers 111 is used for playing back sound according to a received left output sound signal 81, wherein the first output sound signal 81 is generated by the microcontroller 30 by means of processing the first sound signal 91. The other one of the two speakers 111 is used for playing back sound according to a received second output sound signal 82, wherein the right output sound signal 82 is generated by the microcontroller 30 by means of processing the second sound signal 92.

Next, please refer to FIG. 13, which illustrates a flowchart of a method of decreasing the effect of an interference sound according to the present disclosure. Please note that the abovementioned detection device 1 is employed as an example for describing the method of decreasing the effect of an interference sound according to the present disclosure and also that the method disclosed in this present disclosure is not limited to application to the detection device 1 as disclosed above.

First, performing step S1: receiving an input sound 90A or 90B by the two sound receivers 112 to respectively acquire a first sound signal 91 and a second sound signal 92.

When the user uses the detection device 1 of the present disclosure, the two sound receivers 112 can be used to receive the input sound 90A or 90B from an external environment. After one of the two sound receivers 112 receives the input sound 90A or 90B, it will generate and acquire the first sound signal 91. After the other one of the two sound receivers 112 receives the input sound 90A or 90B, it will generate and acquire the second sound signal 92. The first sound signal 91 and the second sound signal 92 will both be transmitted to the microcontroller 30.

Performing step S2: determining and acquiring a plurality of sound source position data according to a phase difference between a plurality of sound frames of a plurality of position low-frequency sound signals of the first sound signal 91 and a plurality of sound frames of a plurality of position low-frequency sound signals of the second sound signal 92.

When the user uses the detection device 1 of the present disclosure, the two sound receivers 112 will be respectively disposed at two relative ends at a distance of L centimeters, where $7 \leq L \leq 40$. Because the time of transmitting a sound wave to the two sound receivers 112 might be different, the main direction of the input sound 90A and 90B can be determined by means of comparing the phase difference between the first sound signal 91 and the second sound signal 92.

If the wavelength of the sound signal is shorter than the distance D between the two sound receivers 112, it will result in difficulty of determining the signals to be compared. Therefore, in this embodiment, the low-frequency sound signal analysis module 31 of the microcontroller 30 of the present disclosure will only use, from the first sound signal 91 and the second sound signal 92, sound signals having their frequencies within a specific range (i.e., the position low-frequency sound signals) for position determination. In a specific embodiment of the present disclosure, the frequency of the position low-frequency sound signal is selected from, without limiting the scope of the present disclosure, 500, 700, 900, 1100, 1300 and 1500 Hz.

Furthermore, to determine the source orientation of the input sound 90A or 90B more precisely, the low-frequency sound signal analysis module 31 of the microcontroller 30 of the present disclosure will further take samples of a plurality of sound frames of each of the position low-frequency sound signals. For example, the present disclosure takes samples of first ten sound frames of each of the position low-frequency sound signals from the first sound signal 91 and the second sound signal 92 as determination data.

As a result, the low-frequency sound signal analysis module 31 of the microcontroller 30 of the present disclosure analyzes and determines whether the input sound 90A or 90B originates from the target orientation according to a phase difference between the same sound frames at the same frequency of the position low-frequency sound signals of the first sound signal 91 and the second sound signal 92 so as to determine and acquire a plurality of sound source position data according to each of the determination results. In a specific embodiment of the present disclosure, if the first sound frames at 500 Hz of the position low-frequency sound signals of the first sound signal 91 and the second sound signal 92 indicate that the input sound 90A originates from the target orientation, the sound source position data having a code of "1" will be acquired; furthermore, if the second sound frames at 500 Hz of the position low-frequency sound signals of the first sound signal 91 and the second sound signal 92 indicate that the input sound 90B does not come from the target orientation, the sound source position data having a code of "0" will be acquired. The corresponding sound source position data will be acquired according to the determination results by means of applying the same computation to the remaining sound frames. Likewise, the corresponding sound source position data of the position low-frequency sound signals at other frequency bands of the first sound signal 91 and the second sound signal 92 can also be acquired by means of applying the same computation.

Generally speaking, a talker and a listener will usually face each other during a conversation; in this case, if it is determined that the main direction of the input sound 90A received by the two sound receivers 112 originates from the front of the user, the input sound 90A will be determined as not an interference sound; in contrast, if it is determined that the main direction of the input sound 90B does not come from the front of the user, the input sound 90B will be determined as an interference sound. Similarly, when a user holds a smart phone or a tablet computer to play an online game with others via the Internet, in the event that the user wants to talk to other gamers, the user will also face the smart phone or the tablet computer and talk to its screen. Therefore, in the embodiment of the present disclosure, the abovementioned "target orientation" refers to a sector-shaped range extending in a front direction of the user from a center point of a straight line between the two sound receivers 112, under the condition that the two sound receivers 112 are respectively disposed at two relative ends, wherein the inclined angle θ of the sector is 40 degrees (as shown by dotted lines of FIG. 11) without limiting the scope of the present disclosure. Because the technique of analyzing the orientation of the sound source by means of the phase difference between different sound signals generated from the same sound source is well known by those skilled in the art of sound processing, there is no need for further description.

Performing step S3: determining a probability that a main direction of the input sound 90A or 90B is in accordance with a target orientation according to each of the sound source position data.

After the plurality of sound source position data are acquired in step S2, the computing module 33 of the microcontroller 30 of the present disclosure will determine the probability that the main direction of the input sound 90A or 90B is in accordance with the target orientation according to each of the sound source position data. In a specific embodiment of the present disclosure, as described above, if the plurality of sound source position data acquired from the first ten sound frames at 500 Hz of the position low-frequency sound signal from the first sound signal 91 and the second sound signal 92 are "1,0,1,1,1,1,0,1,0,1", the probability that the main direction of the input sound 90A or 90B is in accordance with the target orientation is 70% (according to the computation of 7/10*100%). Likewise, according to the plurality of sound source position data acquired from the first ten sound frames at other frequency bands, the respective probability that the main direction of the input sound 90A or 90B is in accordance with the target orientation can also be determined, for example, as 80%, 80%, 80%, 80%, 70% and 70%, respectively. Finally, the computing module 33 will calculate an average probability of the above 6 probabilities, which is 75% (according to the computation of (70+80+80+80+70+70)/6*%) for being determined as the probability that the main direction of the input sound 90A or 90B is in accordance with the target orientation.

Performing step S4: adjusting, according to the probability that the main direction of the input sound 90A or 90B is in accordance with the target orientation, the sound volume of low-frequency sound signals of the first sound signal 91 and the second sound signal 92 being outputted.

In a specific embodiment of the present disclosure, if the probability that the main direction of the input sound 90A or 90B is in accordance with the target orientation is 75%, the low-frequency sound signal processing module 35 of the microcontroller 30 will lower by 25% the sound volume of the low-frequency sound signals of the first sound signal 91 and the second sound signal 92 being outputted. That is, the low-frequency sound signal processing module 35 will multiply an originally-outputted sound volume of the low-frequency sound signals of the first sound signal 91 and the second sound signal 92 by the determined probability so as to determine an adjusted sound volume of the low-frequency sound signals of the first sound signal 91 and the second sound signal 92. In other words, the higher the probability that the main direction of the input sound 90A or 90B is in accordance with the target orientation is, the less the sound volume of the low-frequency sound signals of the first sound signal 91 and the second sound signal 92 being outputted will be adjusted and lowered. In a specific embodiment of the present disclosure, the low-frequency sound signal refers to a sound signal with a frequency below 4000 Hz. This means that only the sound volume of the sound signal with a frequency below 4000 Hz will possibly be adjusted. Please note that the method of adjusting the sound volume of the present disclosure is not limited to the above description. The sound volume can be adjusted according to different probabilities and respective definitions without limiting the method of multiplying the originally-outputted sound volume by the probability.

Performing step S5: recording a sound volume change of the low-frequency sound signals of the first sound signal and the second sound signal and performing a smoothing process.

Because a sudden drop in the sound signal at each frequency band will sound unnatural to the user, after step S4 is performed, the filtering module 37 of the microcontroller 30 of the present disclosure will record the sound volume change of the low-frequency sound signals of the first sound signal 91 and the second sound signal 92 and then perform a smoothing process. In a specific embodiment, the filtering module 37 can perform a smoothing process on the low-frequency sound signals according to the following formula:

$$Y(n)=Y(n)*\alpha+Y(n-1)*(1-\alpha);$$

where $0<\alpha<1$, and preferably $\alpha$ is 0.9; $Y(n)$ refers to a current low-frequency sound signal; and $Y(n-1)$ refers to a previous low-frequency sound signal. Because the smoothing process is a common technique used in the signal processing field and its related techniques and theories are widely published in many journals and articles, the present disclosure is not limited to using a particular algorithm and there is no need for further description.

In conclusion, the detection device of the present disclosure can be used to detect an instant position of a peripheral object by using a sound generated from the peripheral object, so that a detection range of the detection device can be broader than cameras.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An indoor navigation system, comprising:
a detection device having two detection modules that are configured to be operated at the same time, wherein each of the two detection modules includes:
a speaker and a sound receiver, wherein the sound receiver is configured to continuously receive an external sound generated from a peripheral object in movement so as to obtain an input signal; and
a signal converting circuit electrically coupled to the sound receiver, wherein the signal converting circuit is configured to convert the input signal from the sound receiver into a target spectrogram,
wherein in the detection device, the two spectrograms respectively converted from the two signal converting circuits have a time/phase difference there-between, and wherein at least one of the two detection modules includes:
a storage unit having a plurality of basic spectrograms therein that respectively correspond to sounds respectively generated from different kinds of objects in movement;
a judging circuit electrically coupled to the storage unit, the two signal converting circuits, and the two speakers, wherein the judging circuit is configured to compare any one of the two target spectrograms with the basic spectrograms so as to determine which kind of the objects the peripheral object is, and is configured to obtain an instant position of the peripheral object by the time/phase difference; and
a Bluetooth transceiver electrically coupled to the judging circuit; and
a path planning apparatus including:
a storing member having an indoor map;
a Bluetooth unit wirelessly coupled to the Bluetooth transceiver of the detection device for receiving an instant position of the detection device and the instant position of the peripheral object, wherein the detection device is configured to transmit a navigation request signal to the path planning apparatus through the Bluetooth transceiver and Bluetooth unit; and
a calculating unit electrically coupled to the storing member and the Bluetooth unit, wherein the calculating unit is configured to match the instant position of the detection device and the instant position of the peripheral object with the indoor map so as to obtain an indoor navigation path satisfying the navigation request signal;

wherein the path planning apparatus is configured to transmit the indoor navigation path to the detection device through the Bluetooth unit.

2. The indoor navigation system according to claim 1, wherein the two detection modules are two wireless earphones that are configured as a pair, a quantity of the peripheral object detected by the detection device is more than one, and the detection device is allowed to simultaneously obtain the instant positions of the peripheral objects, wherein the objects include a shopping cart and a pedestrian, and wherein the indoor map stored in the storing member is a market map, and the navigation request signal is a shopping navigation request signal.

3. The indoor navigation system according to claim 2, wherein a quantity of the detection device of the indoor navigation system is more than one, and each of the detection devices is electrically coupled to the path planning apparatus through the Bluetooth transceiver thereof, and wherein the calculating unit is configured to match the instant positions of the detection devices and the instant positions of the peripheral objects with the indoor map so as to obtain the indoor navigation path satisfying the navigation request signal.

4. The indoor navigation system according to claim 2, wherein the two sound receivers are configured to receiver an input sound to respectively acquire a first sound signal and a second sound signal, and the detection device includes a microcontroller electrically connected to the two sound receivers, and wherein the microcontroller includes:
a low-frequency sound signal analysis module used for determining and acquiring a plurality of sound source position data according to a phase difference between a plurality of sound frames of at least one position low-frequency sound signal of the first sound signal and a plurality of sound frames of at least one position low-frequency sound signal of the second sound signal;
a computing module used for determining a probability that a main direction of the input sound is in accordance with a target orientation according to each of the sound source position data; and
a low-frequency sound signal processing module used for adjusting, according to the probability, the sound volume of low-frequency sound signals of the first sound signal and the second sound signal being outputted.

5. The indoor navigation system according to claim 4, wherein the higher the probability is, the lesser the sound volume of the low-frequency sound signals of the first sound signal and the second sound signal being outputted is adjusted and lowered.

6. The indoor navigation system according to claim 5, wherein the frequency of the at least one position low-frequency sound signal is X Hz, and 500≤X≤1500.

7. The indoor navigation system according to claim 6, wherein a quantity of the at least one position low-frequency sound signal is plural, and the frequency of the low-frequency sound signal of the first sound signal and the frequency of the low-frequency sound signal of the second sound signal are below 4000 Hz.

8. The indoor navigation system according to claim 4, wherein the microcontroller further comprises a filtering module, used for recording a sound volume change of the low-frequency sound signals of the first sound signal and the second sound signal and performing a smoothing process.

9. The indoor navigation system according to claim 1, wherein the detection device is provided to be assembled to a car, a quantity of the peripheral object detected by the detection device is more than one, and the detection device is allowed to simultaneously obtain the instant positions of the peripheral objects, wherein the objects include a car, a motorcycle, and a pedestrian, and wherein the indoor map stored in the storing member is a parking lot map, and the navigation request signal is a parking navigation request signal.

10. The indoor navigation system according to claim 9, wherein a quantity of the detection device of the indoor navigation system is more than one, and each of the detection devices is electrically coupled to the path planning apparatus through the Bluetooth transceiver thereof, and wherein the calculating unit is configured to match the instant positions of the detection devices and the instant positions of the peripheral objects with the indoor map so as to obtain the indoor navigation path satisfying the navigation request signal.

11. A detection device for being wirelessly coupled to a path planning apparatus, the detection device comprising:
two detection modules configured to be operated at the same time, wherein each of the two detection modules includes:
a speaker and a sound receiver, wherein the sound receiver is configured to continuously receive an external sound generated from a peripheral object in movement so as to obtain an input signal; and
a signal converting circuit electrically coupled to the sound receiver, wherein the signal converting circuit is configured to convert the input signal from the sound receiver into a target spectrogram,
wherein in the detection device, the two spectrograms respectively converted from the two signal converting circuits have a time/phase difference there-between, and wherein at least one of the two detection modules includes:
a storage unit having a plurality of basic spectrograms therein that respectively correspond to sounds respectively generated from different kinds of objects in movement;
a judging circuit electrically coupled to the storage unit, the two signal converting circuits, and the two speakers, wherein the judging circuit is configured to compare any one of the two target spectrograms with the basic spectrograms so as to determine which kind of the objects the peripheral object is, and is configured to obtain an instant position of the peripheral object by the time/phase difference; and
a Bluetooth transceiver electrically coupled to the judging circuit;
wherein the detection device is configured to transmit an instant position of the detection device and the instant position of the peripheral object to the path planning apparatus through the Bluetooth transceiver.

* * * * *